(12) United States Patent
Gauthier et al.

(10) Patent No.: US 8,247,113 B2
(45) Date of Patent: Aug. 21, 2012

(54) TITANATES OF PEROVSKITE OR DERIVED STRUCTURE AND APPLICATIONS THEREOF

(75) Inventors: Gilles Gauthier, Bilieu (FR); Thibaud Delahaye, Saint Martin le Vinoux (FR)

(73) Assignee: Commissariat a l'Energie Atomique, Paris (FR)

( * ) Notice: Subject to any disclaimer, the term of this patent is extended or adjusted under 35 U.S.C. 154(b) by 422 days.

(21) Appl. No.: 12/422,773

(22) Filed: Apr. 13, 2009

(65) Prior Publication Data
US 2010/0015489 A1   Jan. 21, 2010

(30) Foreign Application Priority Data
Apr. 14, 2008   (FR) ...................... 08 02032

(51) Int. Cl.
| H01M 4/00 | (2006.01) |
| H01M 4/02 | (2006.01) |
| H01M 4/13 | (2010.01) |
| H01M 4/36 | (2006.01) |
| H01M 4/58 | (2010.01) |
| H01M 4/90 | (2006.01) |

(52) U.S. Cl. ............... 429/209; 429/218.1; 429/220; 429/221; 429/223; 429/231.5; 429/523; 429/527; 502/525

(58) Field of Classification Search ............... 429/209, 429/218.1, 220, 221, 223, 231.5, 523, 527; 502/525
See application file for complete search history.

(56) References Cited

U.S. PATENT DOCUMENTS

| 4,133,778 | A | * | 1/1979 | Gray | 252/517 |
| 4,562,124 | A | * | 12/1985 | Ruka | 429/489 |
| 5,342,704 | A | * | 8/1994 | Vasilow et al. | 429/535 |
| 6,090,249 | A | * | 7/2000 | Guth | 204/421 |
| 6,352,955 | B1 | * | 3/2002 | Golden | 502/302 |
| 7,368,095 | B2 | * | 5/2008 | Munakata et al. | 423/263 |
| 7,670,711 | B2 | * | 3/2010 | Marina et al. | 429/411 |
| 7,718,317 | B2 | * | 5/2010 | Adamson et al. | 429/231.1 |
| 7,820,339 | B2 | * | 10/2010 | Gordon et al. | 429/534 |
| 7,943,270 | B2 | * | 5/2011 | Blake et al. | 429/513 |
| 2004/0265669 | A1 | | 12/2004 | Yoo et al. | |

FOREIGN PATENT DOCUMENTS

| JP | 2005-50760 | 2/2005 |
| JP | 2007-51033 | 3/2007 |
| WO | WO 03/094268 | 5/2003 |

OTHER PUBLICATIONS

Slater, et al. "Synthesis and electrical characterisation of doped perovskite titanates as potential anode materials for solid . . . " J. Mater Chem., 7:12, 2495-2498, 1997.
Fu et al., Inspec database Accession No. 8841093, (2006).

* cited by examiner

*Primary Examiner* — Patricia L Hailey
(74) *Attorney, Agent, or Firm* — Morgan, Lewis & Bockius LLP

(57) ABSTRACT

Materials of the titanate type of perovskite or derived structure and their uses for the production of electrodes, more particularly in the cell elements of an SOFC cell or the cell elements of a high-temperature steam electrolysis cell.

10 Claims, 3 Drawing Sheets

TITANATES OF PEROVSKITE OR DERIVED STRUCTURE AND APPLICATIONS THEREOF

CROSS-REFERENCE TO RELATED APPLICATIONS

The present application claims the benefit to French Application No. 0802032, filed Apr. 14, 2008, which is herein incorporated by reference in its entirety.

BACKGROUND OF THE INVENTION

One subject of the invention is novel materials of titanate type of perovskite or derived structure and their uses for the production of electrodes, more particularly in the cell elements of an SOFC cell (solid oxide fuel cell) or the cell elements of a high-temperature steam electrolysis cell (HT-SEC), also known under the name of SOEC (solid oxide electrolysis cell). These novel materials have the distinctive feature of being able to be used as an SOFC cathode material, an SOEC anode material and also, after partial reduction, as an SOFC anode material or SOEC cathode material.

The SOFC cell elements constitute one of the most advanced systems for producing electricity with a high yield and without harming the environment. They may use hydrogen or a hydrocarbon such as methane as fuel.

Each cell element comprises two electrodes, an anode and a cathode, separated by an electrolyte.

Each electrode compartment must be composed of a material which satisfies several constraints: the microstructure must be stable during the production and use of the cell element; the various components of the cell element must be chemically compatible and have similar thermal expansion coefficients; the porosity and the catalytic activity must enable the cell element to exhibit good performances. More specifically, the anode and the cathode must be endowed with a high electronic conductivity.

Moreover, they must be stable under reducing conditions for the anode and under oxidizing conditions for the cathode. It is also desirable that the electrode material has an ionic conductivity.

The customary material for the production of the electrolyte is zirconium oxide stabilized with yttrium oxide (YSZ or yttria-stabilized zirconia).

The anodes of the SOFC cells are usually composed of a ceramic/metal (cermet) mixture. Nickel-based cermets, in particular cermets based on Ni and on yttria-stabilized zirconia (YSZ) have been developed and function remarkably with hydrogen as fuel. For cell elements functioning with hydrocarbons, Ni/cerine or Cu/cerine cermets have been developed more recently.

Ni/YSZ cermets nevertheless have many drawbacks: at high temperature they cause sintering of nickel particles, sulphur poisoning and deposition of carbon when the system functions with hydrocarbons. If, in order to prevent the deposition of carbon, a large amount of water is introduced at the top of the cell element, this leads to an accelerated growth of the nickel grains and eventually to a loss of the performances of the electrode.

In the case of the HTSEC cell elements, the use of Ni/YSZ cermet involves using a large amount of hydrogen in water used as fuel at the cathode inlet, in order to avoid oxidation of the nickel to NiO and/or Ni(OH) in particular, which would lead to a degradation of the electrode, especially during the shutdown phases of the system.

Several paths have been studied with a view to replacing the cermets in the cell elements of SOFC cells.

The titanate of strontium alone, only substituted by lanthanum (La) at site A, is not suitable as explained in Q. X. Fu et al., Journal of the Electrochemical Society, 153(4) D74-D83 (2006) and Olga A. Marina et al., Solid State Ionics, 149 (2002), 21-28.

Strontium titanates substituted by other transition metals appear to constitute a promising path, but their development requires improvements in the formulation of the material.

One of the solutions envisaged for limiting the premature ageing observed at the electrode/electrolyte interfaces is to develop novel materials which may be used both as cathode and as anode. This is because the introduction of one and the same electrode material means, above all, a single chemical and thermo-mechanical compatibility with the electrolyte to be controlled within the cell element. The symmetrical configuration furthermore allows a certain number of significant simplifications.

Specifically, the introduction of one and the same material for the electrodes should facilitate the reduction of the mechanical stresses within the cell element. It should also permit the simplification of the production method by the use of a co-sintering of the electrodes, which may limit the inter-diffusion phenomena within the cell element, while making it possible to decrease the manufacturing cost and the sometimes tricky handling thereof. Thus cell elements that are more robust, more reliable and potentially less expensive should be able to be produced.

Another of the objectives that it is desired to achieve is the synthesis of a novel type of cermet containing a very small amount of nickel that has a purely catalytic role combined with a mixed (ionic/electronic) conductive ceramic matrix that moreover is basic, that is to say has a high "decoking" power in the presence of small amounts of $H_2O$ and/or $CO_2$.

It has especially been sought to obtain a basic compound comprising a very small amount of catalyst, which is extremely divided and therefore extremely active, and distributed homogeneously at the porosity/ceramic interface.

In order to solve all of these problems it has been sought to develop a material that can be used for manufacturing the anode and the cathode so as to solve the problems of thermal, chemical and mechanical compatibility within the cell element and to simplify the manufacturing conditions of the cell element.

Symmetrical cell elements, using the same material as anode material and as cathode material, are known in the prior art: D. M. Bastidas, et al., Journal of Material Chemistry, 16, (2006), 1603-1605, highlighted the possibility of using a perovskite-type compound $(La_{0.75}Sr_{0.25})Cr_{0.5}Mn_{0.5}O_3$ (LSCM) as electrode material for an SOFC which can be used both as anode and as cathode in order to develop symmetrical cell elements. The first tests carried out on the symmetrical cell element (LSCM/YSZ/LSCM) show relatively good performances at 900° C.: 300 mW·cm$^{-2}$ under $H_2$ and 225 mW·cm$^{-2}$ under $CH_4$. In this precise case, it is the same material, stable under redox cycling, which is recommended as the anode and cathode material for an SOFC.

J. C. Ruiz-Moralez et al., Electrochimica Acta, 52, (2006), 278-284 have sought to optimize the micro-structure of LSCM-based electrodes in order to increase the performances of the LSCM/YSZ/LSCM cell element. They obtained, at 950° C., a power of 550 mW·cm$^{-2}$ under $H_2$ and of 350 mW·cm$^{-2}$ under $CH_4$. Even though they are already worthy of interest, these values are however not yet high enough given the operating temperature.

Another type of symmetrical cell elements $La_{0.75}Sr_{0.25}Cr_{0.5}X'_{0.5}O_{3-\delta}/La_{0.9}Sr_{0.1}Ga_{0.9}Mg_{0.2}O_{2.85}/La_{0.75}Sr_{0.25}Cr_{0.5}X'_{0.5}O_{3-\delta}$ (X'=Mn, Fe and Al) was developed recently by this team (J. Peña-Martínez, et al., Electrochimica Acta, 52, (2007), 2950-2958). They achieved a maximum power of 54 mW·cm$^{-2}$ at 800° C. under (5%) humidified Ar/H$_2$ for cell elements of the La$_{0.75}$Sr$_{0.25}$Cr$_{0.5}$M'$_{0.5}$O$_{3-\delta}$/La$_{0.9}$Sr$_{0.1}$Ga$_{0.8}$Mg$_{0.2}$O$_{2.85}$/La$_{0.75}$Sr$_{0.25}$Cr$_{0.5}$Mn'0.5O$_{3-\delta}$ type. These recent studies show the benefit of developing the technology of symmetrical cell elements.

Document WO 03/094268 describes doped strontium titanates and their use for producing electrodes of electrochemical cell elements and of devices such as SOFCs and SOECs.

Titanium may be substituted by Ni up to a maximum level of 20%.

BRIEF SUMMARY OF THE INVENTION

The present invention is based on the development of a novel material of titanate type of perovskite structure substituted on the site of the titanium by a transition element such as, for example, nickel that can be reduced under hydrogen so as to change to the metallic state.

This property enables the material to be used as the cathode of an SOFC cell element and simultaneously, once reduced, as the anode for one and the same cell element.

The first subject of the invention is a compound corresponding to the general formula (I)

$$M^1_{x1}M^2_{x2}(Ti_{(1-y-z)}M^3_yM^4_z)O_{(3-\delta)} \quad (I)$$

in which:
M$^1$ represents an atom or a mixture of atoms chosen from alkaline-earth metals;
M$^2$ represents an atom or a mixture of atoms chosen from the rare earth elements;
M$^3$ represents an atom or a mixture of atoms chosen from the following transition metals: Ni, Co, Cu;
M$^4$ represents an atom or a mixture of atoms chosen from transition metals other than Ni, Co, Cu; rare earth elements that accept a coordination of 6; poor metals with a (+III) degree of oxidation;
$x=x_1+x_2$ represents the stoichiometry of A relative to B in the perovskite structure ABO$_3$ with $0.9 \leq x \leq 1$; $0 < x_1 < 1$; $0 < x_2 < 1$;
y represents the molar percentage of M$^3$ in the titanium sub-lattice and $0 < y < 1$;
z represents the molar percentage of M$^4$ in the titanium sub-lattice and $0 \leq z < 1$; and
δ represents a number and $0 \leq \delta \leq 0.5$. This coefficient makes it possible to take into account the possible presence of oxygen vacancies in the perovskite structure so as to maintain its electroneutrality and this being especially under a reducing atmosphere in which Ti can adopt, even partially, a degree of oxidation less than +IV.

BRIEF DESCRIPTION OF THE DRAWINGS

In order to facilitate a fuller understanding of the present invention, reference is now made to the accompanying figures. These figures should not be construed as limiting the scope of the present disclosure, but are intended to be exemplary only.

The expression "rare earth elements" denotes a group of 17 elements, comprising the lanthanides: lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and also yttrium (Y) and scandium (Sc).

DETAILED DESCRIPTION OF THE INVENTION

The expression "alkaline-earth metals" denotes a group of atoms composed of Be, Mg, Ca, Sr, Ba and Ra.

The expression "transition metals" denotes a group composed of the 29 chemical elements having atomic numbers 21 to 30, 39 to 48 and 72 to 80: Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg.

The expression "poor metals" denotes a group composed of the metallic chemical elements which, in the Periodic Table of the Elements, are adjacent to the metalloids. This group is more specifically composed of the following atoms: aluminium, gallium, indium, tin, thallium, lead and bismuth.

Preferably, in the formula (I), one or more of the following conditions is satisfied:
M$^1$ is chosen from: Ba, Sr, Ca or a mixture of these atoms;
M$^2$ is chosen from: La, Ce, Pr, Nd, Y or a mixture of these atoms;
M$^3$ represents Ni;
M$^4$ represents an atom or a mixture of atoms chosen from:
  (i) metals from the first transition series, of atomic number from 21 to 30, apart from Ni, Co, Cu and more preferably still from: Mn, Fe, V;
  (ii) the following poor metals: Al, Ga, In;
$0.95 \leq x \leq 1$;
$0.25 \leq y \leq 0.75$.
Preferably, $0 \leq x_1 \leq 0.5$; $0.4 \leq x_2 \leq 1$.

Figure 1:
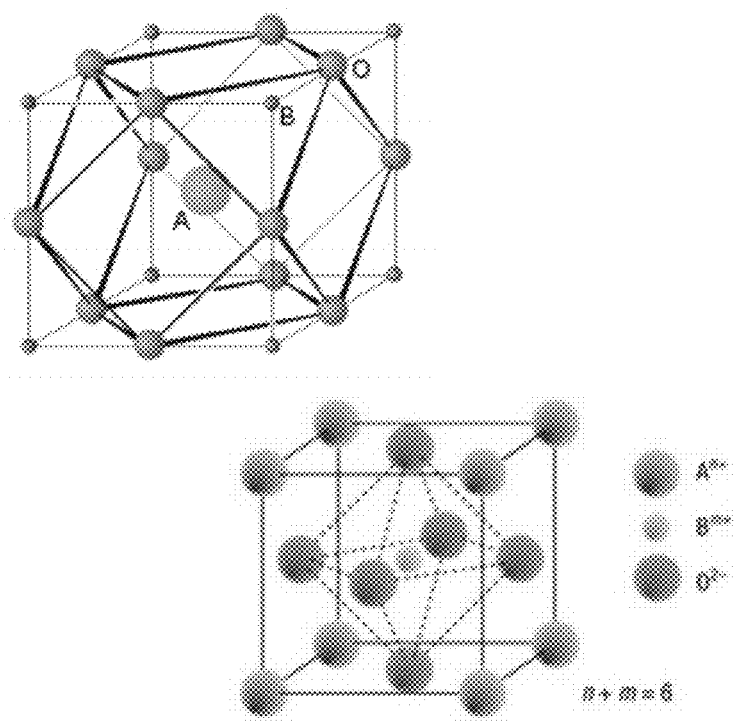
FIG. 1 illustrates an exemplary perovskite structure of compound of formula 1.

The compounds of formula (I) have a perovskite structure. The term perovskite denotes a family of minerals of the same structure for which the general formula is ABO$_3$. In the ideal cubic perovskite structure, the coordination of the A atoms is 12: they are in a site having a cubic oxygen environment. The coordination of the B atoms is 6: they are in a site having an octahedral oxygen environment. Thus, the perovskite structure is composed of BO$_6$ octahedra linked by the vertices along the three crystallographic axes, the A atoms being placed in the sites left vacant by the octahedra (FIG. 1).

Nevertheless, it is rare that the structure remains so symmetrical and many distortions are generally observed (polar displacements, rational displacements or displacements under the Jahn-Teller effect of the ions), as is described by K. S. Aleksandrov et al. (K. S. Aleksandrov and V. V. Berznosikov, Hierarchies of perovskite-like crystals (review), Phys. Solid State, 39, (1997), 695-714).

Another subject of the invention is a method of manufacturing compounds of formula (I).

The compounds of formula (I) are prepared, as a general rule, in the presence of air. The metallic carbonates and/or oxides of Ti, $M^1$, $M^2$, $M^3$ and $M^4$ are chosen depending on the expected formula (I), and in the appropriate stoichiometric proportions, that is to say the stoichiometric proportions of the formula chosen.

The components (metallic carbonates and/or oxides) are subjected to a milling operation preferably in the presence of a solvent, for instance a light hydrocarbon, such as for example pentane, hexane, heptane, or possibly a light alcohol of ethanol type or else a ketone such as acetone and in the presence of air, for several minutes to several hours. Then the solvent is evaporated, the powder is pelleted and calcined, preferably at a temperature above 1000° C., advantageously between 1000° C. and 1400° C., for several hours in air.

According to one variant, one subject of the invention is a compound of general formula (II):

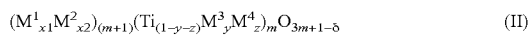
$$(M^1_{x1}M^2_{x2})_{(m+1)}(Ti_{(1-y-z)}M^3_yM^4_z)_mO_{3m+1-\delta} \qquad (II)$$

in which $M^1$, $M^2$, $M^3$, $M^4$, $x_1$, $x_2$, y, z and $\delta$ have the same meaning as in formula (I) and m is an integer greater than or equal to 1.

According to this variant, the compound of formula (II) has a structure derived from perovskite and that is known as a Ruddlesden-Popper structure, comparable to those illustrated by F. Lichtenberg et al. (Progress in Solid State Chemistry, 29, (2001), 1-17) and may be obtained according to a method similar to that used for obtaining compounds of formula (I) by adapting the protocols in accordance with the prior art teachings of F. Lichtenberg et al. (Progress in Solid State Chemistry, 29, (2001), 1-18) and W. Sugimoto et al. (Solid State Ionics, 108, (1998), 315-319).

Preferably, in the formula (II) one or more of the following conditions is satisfied:

$M^1$ is chosen from: Ba, Sr, Ca or a mixture of these atoms;
$M^2$ is chosen from: La, Ce, Pr, Nd, Y or a mixture of these elements;
$M^3$ represents Ni;
$M^4$ represents an atom or a mixture of atoms chosen from:
  (i) metals from the first transition series, of atomic number from 21 to 30, apart from Ni, Co, Cu and more preferably still an atom or a mixture of atoms chosen from: Mn, Fe, V;
  (ii) the following poor metals: Al, Ga, In;
m=1;
$0.95 \leq x \leq 1$;
$0.25 \leq y \leq 0.75$.
Preferably $0.20 \leq x_1 \leq 0.80$; $0.20 \leq x_2 \leq 0.80$.

The novel perovskite materials of the invention, of formula (I) or (II), may be used for manufacturing cathodes of SOFC cells or anodes of HTSEC cell elements.

The novel perovskite materials of the invention of formula (I) or (II) may also be used for manufacturing the material of anodes for SOFC cells or of cathodes for HTSEC cell elements. In order to do this, they are subjected to a step of partial reduction which results in a composite material having a very homogeneous dispersion of the metallic compound $M^3$ at the surface of the support material.

The reduction of the cathode material for forming the constituent cermet of the hydrogen electrode is based on the exsolution method. Forming cermets by exsolution has been greatly developed in the field of catalysis in order to obtain composites having a very homogeneous dispersion of the metallic catalyst at the surface of the catalysis support and to improve the closeness between catalyst and catalysis substrate. This method, which consists in reducing, often in situ, a compound containing a metallic element (generally nickel) in order to remove it from the crystalline structure completely or partly and to then form the cermet, was named the SPC (solid phase crystallization) method by R. Shiozaki et al. (Stud. Surf. Sci. Catal., 110, (1997), 701-710). The cermets then formed are used at temperature in the presence of $CH_4$ to produce, by partial oxidation, synthesis gas (syngas). This method is more advantageous for preparing cermets than the impregnation technique, which does not make it possible to obtain such a homogeneous distribution of nickel nanoparticles.

T. Hayakawa et al. have in particular studied a great deal the use, via SPC, of cermets of the Ni/$Ca_{1-x}Sr_xTiO_3$ type (T. Hayakawa et al., Angew. Chem. Int. Ed. Engl., 35, (1996), 192-195; K. Takehira, et al., Catalysis Today, 24, (1995), 237-242) and the composites $Ca_{0.8}Sr_{0.2}Ti_{0.8}Ni_{0.2}O$ and $La_{0.8}Sr_{0.2}CO_{0.8}Ni_{0.2}O$ (T. Hayakawa et al., Catal. Lett., 22, (1993), 307-317) for purely catalytic applications. In the devices and methods of the invention, the application is anything but, since these compounds are integrated into symmetrical electrochemical systems and it is the same material which is used both as an air electrode (compound remaining single-phase) and hydrogen electrode (compounds becoming a cermet).

In comparison to the electrodes from the prior art, the electrodes of the invention have improved electrochemical, electrical, mechanical and catalytic properties. They can be used with all types of fuels without exhibiting the drawbacks of Ni/YSZ electrodes.

One subject of the invention is an electrode of an electrochemical device such as an SOFC device or an HTSEC device, this electrode comprising a material according to one of the formulae (I) and (II).

Another subject of the invention is an electrode of an electrochemical device, this electrode comprising a material resulting from the reduction of a material according to the formulae (I) and (II).

Advantageously, the reduction of the material of the invention of the air electrode is carried out under the following conditions: firing under reducing conditions, in particular under $H_2$, at a temperature between 800 and 1500° C. and for a time that varies from a few minutes to a few hours, and more advantageously between 1000 and 1300° C. and for durations between 1 and 24 h.

This treatment may be carried out on the isolated electrode or directly in the cell element.

According to the invention, the material of formula (I) or (II) may be the constituent material of the electrode. Also according to the invention, the material resulting from the reduction of the material of formula (I) or (II) may be the constituent material of the electrode.

These novel materials may also be used in other applications, especially as a functional layer of an electrode. More generally, one subject of the invention is any component of an electrochemical article, characterized in that it comprises a compound of general formula (I) or of general formula (II), and any component of an electrochemical article, characterized in that it comprises a compound resulting from the reduction of a compound of general formula (I) or of general formula (II).

The expression "functional layer" is understood to mean a thin layer of an electroconductive material placed between the electrode (anode or cathode) and the electrolyte. Optionally several functional layers of various materials may be superposed. These functional layers serve to protect the electrode itself from degradation, or to improve the performances or the catalytic activity of the electrode. A functional layer generally has a thickness of 1 to 50 μm, preferably from 20 to 30 μm. It may be porous, in particular it may exhibit up to 70% porosity.

Another subject of the invention is an electrochemical cell element comprising an anode, a cathode and an electrolyte, in which the anode and the cathode comprise one and the same material chosen from those of formula (I) and (II).

Another subject of the invention is an electrochemical cell element comprising an anode, a cathode and an electrolyte, in which one of the electrodes is made from a material chosen from those of formula (I) and (II) and the other electrode is made from a material resulting from the reduction of the material of the first electrode.

Another subject of the invention is a solid oxide fuel cell or SOFC, this cell comprising a cathode, an anode and an electrolyte, assembled in a laminar manner, the electrolyte being placed between the anode and the cathode, the cathode comprising a compound of general formula (I) or of general formula (II) and the anode comprising a material identical to that of the cathode or a material resulting from the reduction of the material of the cathode.

The electrolyte may be made from any material normally used in SOFC cell elements. In particular, it is possible to use, as the electrolyte, yttria-stabilized zirconia (YSZ) which has a good thermal and chemical stability. But it is also possible to use substituted or unsubstituted cerine, perovskites such as $LaGaO_3$ substituted with Sr and/or with Mg.

Another subject of the invention is a high-temperature steam electrolysis cell comprising at least one component, in particular at least one anode, made from a material of formula (I) or of formula (II) as were described above and the cathode comprising a material identical to that of the anode or a material resulting from the reduction of the material of the anode.

The electrolyte may be made from any material normally used in SOFC cell elements. In particular, it is possible to use, as the electrolyte, yttria-stabilized zirconia (YSZ) which has a good thermal and chemical stability. But it is also possible to use substituted or unsubstituted cerine, perovskites such as $LaGaO_3$ substituted with Sr and/or with Mg.

During operation, it will not strictly speaking be the same compounds that are encountered on both sides of the cell element but rather a compound of the nominal composition A on the air side and, under reducing atmosphere, a cermet $zM^3/A'+A''$ which derives therefrom by exsolution of the transition element $M^3$ (Ni, Co, Cu) in the form of fine metallic particles, leaving an oxide compound A' that is less rich in or even free from the metal $M^3$, and that in general is mostly electronically conductive, and optionally accompanied by a second oxide compound A'' that is less rich in or even free from the metal $M^3$, and that in general is electronically insulating. Since the reduction on the hydrogen electrode side takes place in operando, it is strictly the same material that is present on the cathode and anode side during the forming and co-sintering, thus facilitating these steps. Subsequently, the cermet formed on the hydrogen electrode side, due to its structural affiliation with the compound on the air electrode side, will exhibit thermomechanical characteristics similar to the latter. The thermomechanical ageing will then be limited.

The cell elements according to the invention are less expensive since they only use a single material for the manufacture of the anode and of the cathode, the production method comprises a single heat treatment step to lead to a co-sintering of the electrodes, which makes it possible to limit the interdiffusion problems within the cell element.

Thus, it is possible to obtain cell elements that are more reliable, more robust and potentially less expensive.

These novel materials make it possible to envisage new methods for producing electrochemical cell elements. Besides the customary methods for producing electrochemical cell elements, it is possible to anticipate a novel method which comprises a step of dipping an electrolyte into a product of formula (I) or (II), this dip-coating allowing the product to be deposited on both faces of the electrolyte, then a drying operation and a co-sintering heat treatment. On starting up the cell element, the hydrogen electrode is reduced and the cell element can begin normal operation.

Otherwise, conventionally, an ink is produced by diluting the material of the invention in a binder and is deposited by screen-printing onto one or preferably onto both faces of the electrolyte, then it is heat-treated so as to cause the sintering of the deposition.

EXAMPLES

Example 1

Synthesis of the $La_{0.5}Sr_{0.5}Ti_{0.75}Ni_{0.25}O_3$ Compound (~4 g) in Pulverulent Form Via a Solid Route The $La_2O_3$ (1.53782 g), $Sr(CO_3)$ (1.39350 g), $TiO_2$ (1.13092 g) and NiO (0.35255 g) precursors were mixed by hand in stoichiometric proportions in an agate mortar in the presence of acetone to facilitate the homogenization. The resulting mixture was calcined at 1200° C. for 12 h in air according to the following heat treatment:

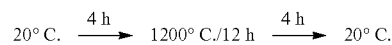

Then, the compound formed was milled and pressed into the form of a pellet by means of a uniaxial pressing operation. This pellet then underwent a second heat treatment of 24 h at 1350° C. in air.

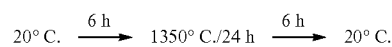

Figure 2:
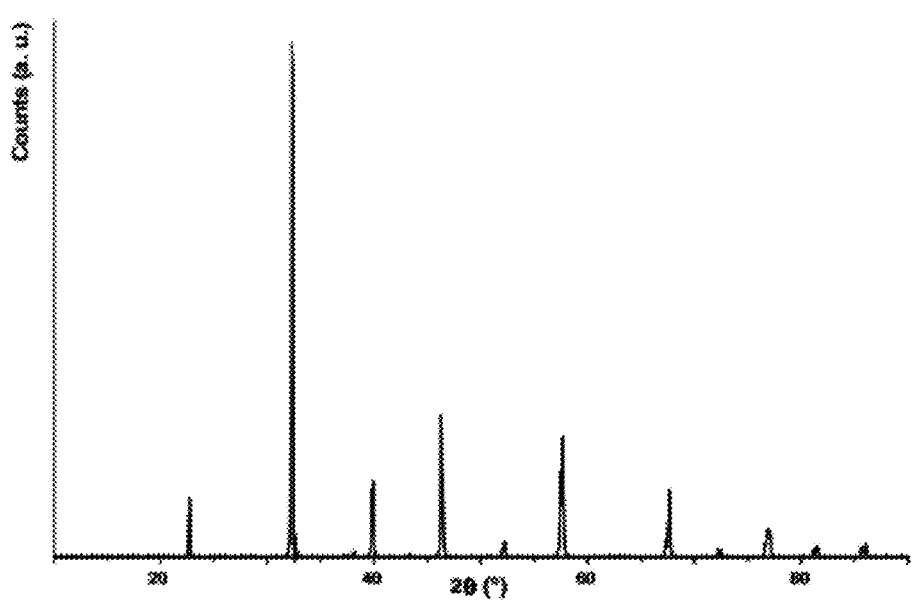
FIG. 2 illustrates an exemplary powder x-ray diffraction of a compound of formula 1 La$_{0.5}$Sr$_{0.5}$Ti$_{0.75}$Ni$_{0.25}$O$_3$.

It was then milled by hand and sieved (20 μm sieve) in order to obtain the powder of $La_{0.5}Sr_{0.5}Ti_{0.75}Ni_{0.25}O_3$. The compound then synthesized was pure as shown by the X-ray powder diffraction diagram from FIG. 2.

Example 2

Synthesis of the $Ce_{0.5}Sr_{0.5}Ti_{0.75}Ni_{0.25}O_3$ Compound (~4 g) in Pulverulent Form Via a Solid Route The $Ce_2(CO_3)_3$ (2.16671 g), $Sr(CO_3)$ (1.38984 g), $TiO_2$ (1.12545 g) and NiO (0.35161 g) precursors were mixed by hand in stoichiometric proportions in an agate mortar in the presence of acetone to facilitate the homogenization. The resulting mixture was calcined at 1200° C. for 12 h in a stream of argon (7 ml·h$^{-1}$) according to the following heat treatment:

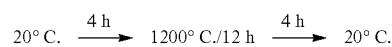

Then, the compound formed was milled and pressed into the form of a pellet by means of a uniaxial pressing operation.

This pellet then underwent a second heat treatment of 24 h at 1350° C. in a stream of argon (7 ml·h$^{-1}$).

It was then milled by hand and sieved (20 µm sieve) in order to obtain the powder of $Ce_{0.5}Sr_{0.5}Ti_{0.75}Ni_{0.25}O_3$.

Example 3

Production, by Screen-Printing, of an Anode Based on $La_{0.5}Sr_{0.5}Ti_{0.75}Ni_{0.25}O_3$ for SOFC 70 wt % of powder were mixed with 30 wt % of a terpineol/ethyl cellulose mixture (95/5 wt %). This preparation was homogenized by hand then by using a three-roll mill (3 successive passes making it possible to obtain a homogenous ink). The ink was then deposited, by screen-printing, on the surface of an (8 mol %) yttria-stabilized zirconia supporting electrolyte. The system formed was then dried for 15 min in an oven at 100° C. In order to give cohesion to the electrode/electrolyte interface and mechanical strength to the deposition, a heat treatment was necessary. The conditions for this treatment were determined via a dilatometry experiment (FIG. 3) carried out in air with vertical geometry on a cylindrical rod of $La_{0.5}Sr_{0.5}Ti_{0.75}Ni_{0.25}O_3$ having a diameter of 10 mm and a thickness of 8.86 mm.

Thus, 4 h at 1200° C. were sufficient:

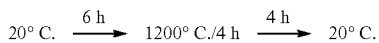

Figure 4:
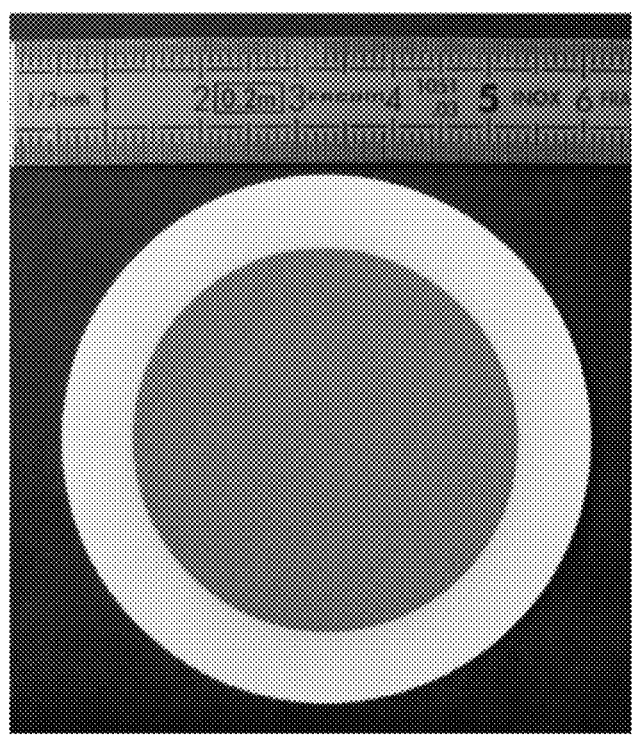
FIG. 4 illustrates an exemplary half-cell element that does not show visible chemical diffusion.

A naturally porous deposition having a thickness of around 40 µm was thus obtained. The half-cell elements formed do not exhibit visible chemical diffusion (FIG. 4).

Figure 3:
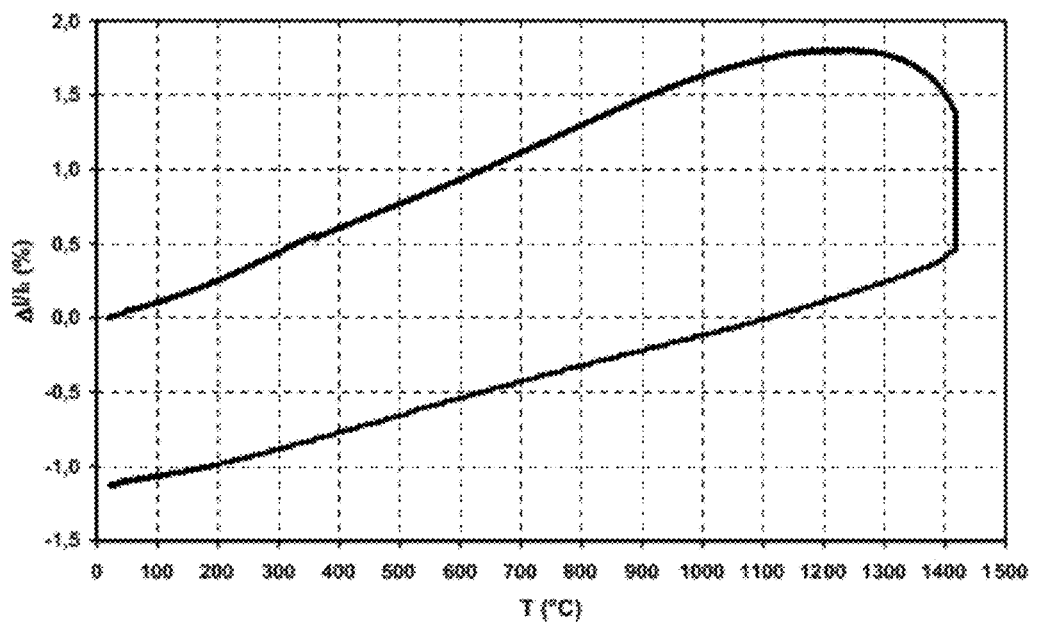
FIG. 3 illustrates an exemplary dilatometry experiment showing the changes in the thermal expansion versus temperature.

From the curve of FIG. 3, it was also possible to determine, on cooling, an approximate thermal expansion coefficient of $11 \cdot 10^{-6}$ K$^{-1}$. This value is typical of a perovskite-structured compound and has the advantage of being very close to that of the 8% YSZ electrolyte ($10 \cdot 10^{-6}$ K$^{-1}$), thus limiting the mechanical stresses at the electrode/electrolyte interface.

Example 4

Figure 5:
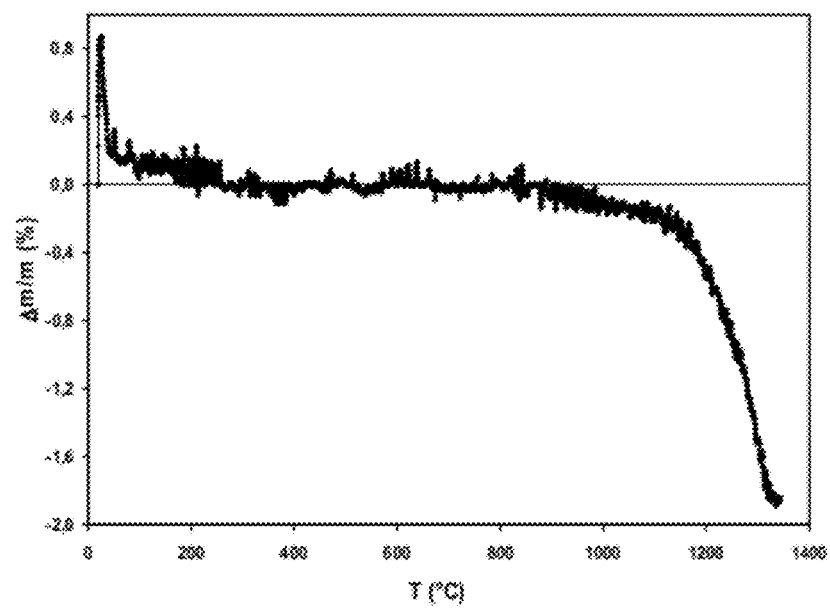
FIG. 5 illustrates an exemplary thermogravimetric analysis showing the change in mass versus temperature.

Reduction of the $La_{0.5}Sr_{0.5}Ti_{0.75}Ni_{0.25}O_3$ Compound to Form the Anode Material Annealing under Ar/H$_2$ (2%) was necessary to form the Ni/[$La_{1/3}Sr_{2/3}TiO_3$, $La_2O_3$] cermet. A thermogravimetric analysis (TGA) under Ar/H$_2$ (2%) was carried out from 20° C. to 1350° C. (FIG. 5). On the curve from FIG. 5, a loss of mass is recorded from around 900° C. and continues up to 1350° C. This change is linked to the decomposition, under a reducing atmosphere, of the $La_{0.5}Sr_{0.5}Ti_{0.75}Ni_{0.25}O_3$ compound to Ni, $La_{1/3}Sr_{2/3}TiO_3$ and $La_2O_3$. An optimum reduction treatment of 1 h at 1300° C. or 24 h at 1200° C. under Ar/H$_2$ (2%) was carried out on the $La_{0.5}Sr_{0.5}Ti_{0.75}Ni_{0.25}O_3$ compound.

Example 5

The compounds $La_{2x}Sr_{1-2x}Ti_{1-x}Ni_xO_3$ (0.25<x<0.45) were synthesized by combustion of a nitrate/citrate gel, which is a variant of the Pechini method (U.S. Pat. No. 3,330,697). $La_2O_3$ (supplier: Rhodia, 99.9%), SrCO$_3$ (supplier: Alfa Aesar, 99.99%), (CH$_3$CO$_2$)$_2$Ni (supplier: Alfa Aesar, >99%) and Ti{OCH(CH$_3$)$_2$}$_4$ (supplier: Alfa Aesar, 99.995%) were used as metallic precursors. X was set by the amount of each precursor used according to the knowledge of a person skilled in the art. The titanium isopropoxide, Ti{OCH(CH$_3$)$_2$}$_4$, was first diluted in an ethylene glycol/citric acid mixture to limit the risks of precipitation during the syntheses. The concentration of titanium ions in this solution was determined by thermogravimetric analysis, 10 h at 1000° C.

Firstly, citric acid $C_6H_8O_7$ was dissolved in a distilled water/nitric acid HNO$_3$ (65 wt %) mixture, then the metallic precursors were added one by one in stoichiometric proportions with stirring and slight heating (40-50° C.). The volume of the mixture was then reduced by heating at 150° C. until it began to gel. A solution of ammonia (NH$_4$OH at 28 vol %) was then added hot to neutralize it to pH=8. The volume of the mixture was again reduced until it started to gel. The gel was then dried in the oven at 100° C. During the drying operation, it swelled and a xerogel was obtained. This product was porous and black in appearance. Pyrolysis of this xerogel under an infrared heating unit made it possible to monitor the combustion reaction. This took place with a large release of gas (CO$_2$, H$_2$O, etc.) and gave a very fine powder which was milled and calcined at 600° C. in order to remove most of the organic compounds. The powder thus obtained was milled by hand so as to homogenize it then calcined according to the following heat treatment:

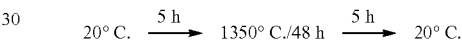

Figure 6:
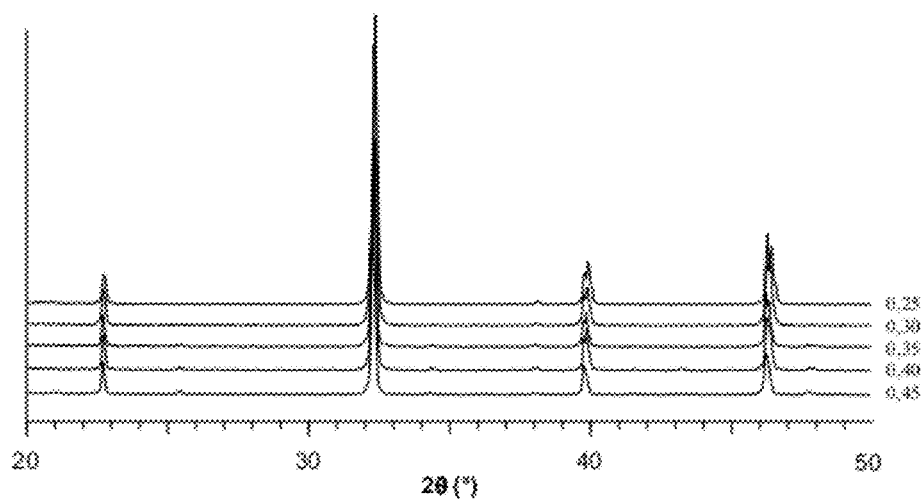
FIG. 6 illustrates an exemplary powder x-ray diffraction diagram of the compounds La$_{2x}$Sr$_{1-2x}$Ti$_{1-x}$Ni$_x$O$_3$ (0.25<x<0.45) after calcination at 1350° C.).

The purity of the compounds was verified by X-ray powder diffraction using a Brüker D8 diffractometer (cf. FIG. 6 XR Diagram of the compounds $La_{2x}Sr_{1-2x}Ti_{1-x}Ni_xO_3$ (0.25<x<0.45) after calcination at 1350° C.).

The invention claimed is:

1. An electrode of an electrochemical device, comprising a material resulting from the reduction of a material chosen from those of formulae (I)

$$M^1_{x1}M^2_{x2}(Ti_{(1-y-z)}M^3_yM^4_z)O_{(3-\delta)} \quad (I)$$

wherein
$M^1$ represents an atom or a mixture of atoms chosen from alkaline-earth metals;
$M^2$ represents La;
$M^3$ represents an atom or a mixture of atoms chosen from the group of metals consisting of Ni, Co, Cu;
$M^4$ represents an atom or a mixture of atoms chosen from:
(i) metals from the first transition series, of atomic number from 21 to 30, apart from Ni, Co, Cu;
(ii) the following poor metals: Al, Ga, In; and
wherein
$0.9 \leq x_1+x_2 \leq 1$; $0<x_1<1$; $0<x_2<1$;
$0.25 \leq y \leq 0.75$;
$0 \leq z < 1$;
$0 \leq \delta \leq 0.5$;
and (II)

$$(M^1_{x1}M^2_{x2})(Ti_{(1-y-z)}M^3_yM^4_z)_mO_{3m+1-\delta} \quad (II)$$

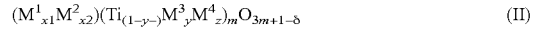

wherein
$M^1$ represents an atom or a mixture of atoms chosen from alkaline-earth metals;
$M^2$ represents La;
$M^3$ represents an atom or a mixture of atoms chosen from the group of metals consisting of Ni, Co, Cu;

M⁴ represents an atom or a mixture of atoms chosen from:
(i) metals from the first transition series, of atomic number from 21 to 30, apart from Ni, Co, Cu;
(ii) the following poor metals: Al, Ga, In; and
wherein
$0.9 \leq x_1+x_2 \leq 1$; $0<x_1<1$; $0<x_2<1$;
$0.25 \leq y \leq 0.75$;
$0 \leq z<1$;
$0 \leq \delta \leq 0.5$;
m is an integer greater than or equal to 1.

2. The electrode according to claim 1, resulting from the reduction of a material chosen from those of formulae (I) and (II) by a method which comprises the following steps:
firing under reducing conditions at a temperature between 800 and 1500° C., and for a time that varies from a few minutes to a few hours.

3. The electrode according to claim 1, wherein the firing under reducing conditions is conducted at a temperature between 1000 and 1300° C. and for a duration between 1 and 24 h.

4. An electrochemical cell element comprising an anode, a cathode and an electrolyte, wherein one of the electrodes is made from a material chosen from those of formulae (I)

$$M^1_{x1}M^2_{x2}(Ti_{(1-y-z)}M^3_yM^4_z)O_{(3-\delta)} \quad (I)$$

wherein
M¹ represents an atom or a mixture of atoms chosen from alkaline-earth metals;
M² represents La;
M³ represents an atom or a mixture of atoms chosen from the group of metals consisting of Ni, Co, Cu;
M⁴ represents an atom or a mixture of atoms chosen from:
(i) metals from the first transition series, of atomic number from 21 to 30, apart from Ni, Co, Cu;
(ii) the following poor metals: Al, Ga, In; and
wherein
$0.9 \leq x_1+x_2 \leq 1$; $0<x_1<1$; $0<x_2<1$;
$0.25 \leq y \leq 0.75$;
$0 \leq z<1$;
$0 \leq \delta \leq 0.5$;
and (II)

$$(M^1_{x1}M^2_{x2})(Ti_{(1-y-z)}M^3_yM^4_z)_mO_{3m+1-\delta} \quad (II)$$

wherein
M¹ represents an atom or a mixture of atoms chosen from alkaline-earth metals;
M² represents La;
M³ represents an atom or a mixture of atoms chosen from the group of metals consisting of Ni Co, Cu;
M⁴ represents an atom or a mixture of atoms chosen from:
(i) metals from the first transition series, of atomic number from 21 to 30, apart from Ni, Co. Cu;
(ii) the following poor metals: Al, Ga, In; and
wherein
$0.9 \leq x_1+x_2 \leq 1$; $0<x_1<1$; $0<x_2<1$;
$0.25 \leq y \leq 0.75$;
$0 \leq z<1$;
$0 \leq \delta \leq 0.5$;
m is an integer greater than or equal to 1; and the other electrode is made from a material resulting from the reduction of the material of the first electrode.

5. The electrochemical cell element according to claim 4, wherein the cell element is a solid oxide fuel cell;
wherein the cell comprises a cathode, an anode and an electrolyte; assembled in a laminar manner;
wherein the cathode comprises a compound of formula (I) or (II); and
wherein the anode comprises a material to that of the cathode or a material from the reduction of the material of the identical resulting cathode.

6. The electrochemical cell element according to claim 4, wherein the cell element is a high-temperature steam electrolysis cell, comprising at least one anode made from a material of formula (I) or (II); and
wherein the cathode comprises a material identical to that of the anode or a material resulting from the reduction of the material of the anode.

7. A method of producing an electrochemical element according to claim 4, comprising following steps:
a step of dipping an electrolyte into a product of formula (I) or (II) to provide a dip coating,
wherein the dip coating allows the product to be deposited on both faces of the electrolyte, performing a drying operation and performing a co-sintering heat treatment.

8. An electrochemical cell element comprising an anode, a cathode and an electrolyte, wherein the anode and the cathode comprise one and the same material chosen from those of formulae (I)

$$M^1_{x1}M^2_{x2}(Ti_{(1-y-z)}M^3_yM^4_z)O_{(3-\delta)} \quad (I)$$

wherein
M¹ represents an atom or a mixture of atoms chosen from alkaline-earth metals;
M² represents La;
M³ represents an atom or a mixture of atoms chosen from the group of metals consisting of Ni, Co, Cu;
M⁴ represents an atom or a mixture of atoms chosen from:
(i) metals from the first transition series, of atomic number from 21 to 30, apart from Ni, Co, Cu:
(ii) the following poor metals: Al, Ga, In; and
wherein
$0.9 \leq x_1+x_2 \leq 1$; $0<x_1<1$; $0<x_2<1$;
$0.25 \leq y \leq 0.75$;
$0 \leq z<1$;
$0 \leq \delta \leq 0.5$.
and (II)

$$(M^1_{x1}M^2_{x2})(Ti_{(1-y-z)}M^3_yM^4_z)_mO_{3m+1-\delta} \quad (II)$$

wherein
M¹ represents an atom or a mixture of atoms chosen from alkaline-earth metals;
M² represents La;
M³ represents an atom or a mixture of atoms chosen from the group of metals consisting of Ni, Co, Cu;
M⁴ represents an atom or a mixture of atoms chosen from:
(i) metals from the first transition series, of atomic number from 21 to 30, apart from Ni, Co, Cu;
(ii) the following poor metals: Al, Ga, In; and
wherein
$0.9 \leq x_1+x_2 \leq 1$; $0<x_1<1$; $0<x_2<1$;
$0.25 \leq y \leq 0.75$;
$0 \leq z \leq 1$;
$0 \leq \delta \leq 0.5$;
m is an integer greater than or equal to 1; and
wherein the cell element is a solid oxide fuel cell;
wherein the cell comprises a cathode, an anode and an electrolyte, assembled in a laminar manner;
wherein the cathode comprises a compound of formula (I) or (II); and
wherein the anode comprises a material identical to that of the cathode or a material resulting from the reduction of the material of the cathode.

9. An electrochemical cell element comprising an anode, a cathode and an electrolyte, wherein the anode and the cathode comprise one and the same material chosen from those of formulae (I)

$$M^1_{x1}M^2_{x2}(Ti_{(1-y-z)}M^3_yM^4_z)O_{(3-\delta)} \quad (I)$$

wherein
M$^1$ represents an atom or a mixture of atoms chosen from alkaline-earth metals;
M$^2$ represents La;
M$^3$ represents an atom or a mixture of atoms chosen from the group of metals consisting of Ni, Co, Cu,
M$^4$ represents an atom or a mixture of atoms chosen from:
  (i) metals from the first transition series, of atomic number from 21 to 30, apart from Ni, Co, Cu;
  (ii) the following poor metals: Al, Ga, In; and
wherein
$0.9 \leq x_1+x_2 \leq 1$; $0<x_1<1$; $0<x_2<1$;
$0.25 \leq y \leq 0.75$;
$0 \leq z<1$;
$0 \leq \delta \leq 0.5$;
and (II)

$$(M^1_{x1}M^2_{x2})(Ti_{(1-y-z)}M^3_yM^4_z)_mO_{(3m+1-\delta)} \quad (II)$$

wherein
M$^1$ represents an atom or a mixture of atoms chosen from alkaline-earth metals;
M$^2$ represents La;
M$^3$ represents an atom or a mixture of atoms chosen from the group of metals consisting of Ni, Co, Cu;
M$^4$ represents an atom or a mixture of atoms chosen from:
  (i) metals from the first transition series, of atomic number from 21 to 30, apart from Ni, Co, Cu:
  (ii) the following poor metals: Al, Ga, In; and
wherein
$0.9 \leq x_1+x_2 \leq 1$; $0<x_1<1$; $0<x_2<1$;
$0.25 \leq y \leq 0.75$;
$0 \leq z<1$;
$0 \leq \delta \leq 0.5$;
m is an integer greater than or equal to 1; and
wherein the cell element is a high-temperature steam electrolysis cell, comprising at least one anode made from a material of formula (I) or (II); and
wherein the cathode comprises a material identical to that of the anode or a material resulting from the reduction of the material of the anode.

10. A method of producing an electrochemical cell element comprising an anode, a cathode and an electrolyte, wherein the anode and the cathode comprise one and the same material chosen from those of formulae (I)

$$M^1_{x1}M^2_{x2}(Ti_{(1-y-z)}M^3_yM^4_z)O_{(3-\delta)} \quad (I)$$

wherein
M$^1$ represents an atom or a mixture of atoms chosen from alkaline-earth metals;
M$^2$ represents La;
M$^3$ represents an atom or a mixture of atoms chosen from the group of metals consisting of Ni, Co, Cu;
M$^4$ represents an atom or a mixture of atoms chosen from:
  (i) metals from the first transition series, of atomic number from 21 to 30, apart from Ni, Co, Cu;
  (ii) the following poor metals: AL, Ga, In and
wherein
$0.9 \leq x_1+x_2 \leq 1$; $0<x_1<1$; $0<x_2<1$;
$0.25 \leq y \leq 0.75$;
$0 \leq z \leq 1$;
$0 \leq \delta \leq 0.5$;
and (II)

$$(M^1_{x1}M^2_{x2})(Ti_{(1-y-z)}M^3_yM^4_z)_mO_{(3m+1-\delta)} \quad (II)$$

wherein
M$^1$ represents an atom or a mixture of atoms chosen from alkaline-earth metals;
M$^2$ represents La;
M$^3$ represents an atom or a mixture of atoms chosen from the group of metals consisting of Ni, Co, Cu;
M$^4$ represents an atom or a mixture of atoms chosen from:
  (i) metals from the first transition series, of atomic number from 21 to 30, apart from Ni, Co, Cu:
  (ii) the following poor metals: Al, Ga, In; and
wherein
$0.9 \leq x_1+x_2 \leq 1$; $0<x_1<1$; $0<x_2<1$;
$0.25 \leq y \leq 0.75$;
$0 \leq z<1$;
$0 \leq \delta \leq 0.5$;
m is an integer greater than or equal to 1; and
said method comprising the following steps:
  a step of dipping an electrolyte into a product of formula (I) or (II) to provide a dip coating,
  wherein the dip coating allows the product to be deposited on both faces of the electrolyte, performing a drying operation and
  performing a co-sintering heat treatment.

* * * * *